United States Patent [19]
Zevlakis

[11] Patent Number: 5,281,429
[45] Date of Patent: Jan. 25, 1994

[54] APPARATUS AND METHOD FOR DISPENSING DEFINED PORTIONS OF ICE CREAM OR A LIKE DEFORMABLE PRODUCT

[76] Inventor: John M. Zevlakis, 2109 19th St., 3B, Long Island, N.Y. 11105

[21] Appl. No.: 868,955

[22] Filed: Apr. 16, 1992

[51] Int. Cl.$^5$ .............. A23L 1/48; A23P 1/00; B29C 37/00; B29C 59/04
[52] U.S. Cl. .................................... 426/389; 53/435; 53/436; 53/514; 53/518; 53/520; 53/526; 425/169; 425/296; 425/302.1; 425/335; 425/363; 426/392; 426/393; 426/413; 426/414
[58] Field of Search ............. 426/115, 130, 232, 389, 426/392, 393, 413, 414, 416; 264/167; 425/169, 296, 302.1, 335, 363; 53/435, 436, 513, 514, 518, 520, 523, 526, 527, 528

[56] References Cited

U.S. PATENT DOCUMENTS

| | | | |
|---|---|---|---|
| 2,563,278 | 8/1951 | Rummel et al. | 425/393 |
| 3,226,285 | 12/1965 | Iovenko | 264/167 |
| 3,542,570 | 11/1970 | Bush et al. | 426/413 |
| 4,015,021 | 3/1977 | Harima et al. | 426/393 |
| 4,223,043 | 9/1980 | Johnson | 426/393 X |
| 4,762,483 | 9/1988 | Zevlakis | 425/140 |
| 4,830,864 | 5/1989 | Zevlakis | 426/393 |
| 5,049,108 | 9/1991 | Staudenrausch | 452/48 |
| 5,053,239 | 10/1991 | Vanhatalo | 426/412 |

Primary Examiner—Leo B. Tentoni
Attorney, Agent, or Firm—Olive & Olive

[57] ABSTRACT

The apparatus and method relates to an automatic dispenser for dispensing portions of a product such as ice cream from a supply comprising a coiled tubular casing in which the ice cream is encased. The end of the casing is fed into the apparatus and, as the apparatus operates, moves through to the exit. The casing with its encased ice cream is pulled through the apparatus and pinched at uniform intervals by a first pinching mechanism following which utilizing a second pinching mechanism, the casing with its encased ice cream is further pinched to a thickness of only the casing at the same uniform intervals. The casing with the encased ice cream is then drawn past a cutting device which opens the casing so that a portion defined by sequential pinched segments is dispensed and the casing removed by a scrap spool mechanism.

27 Claims, 5 Drawing Sheets

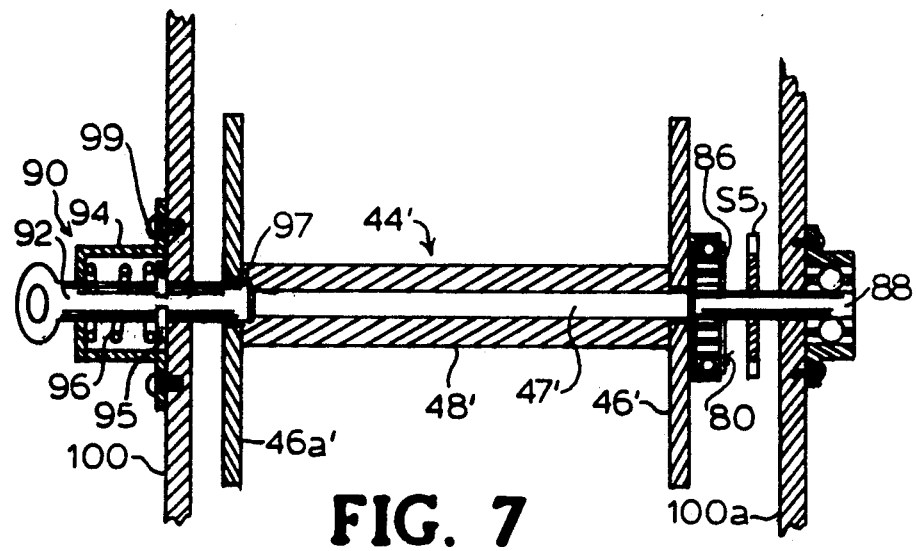
FIG. 7
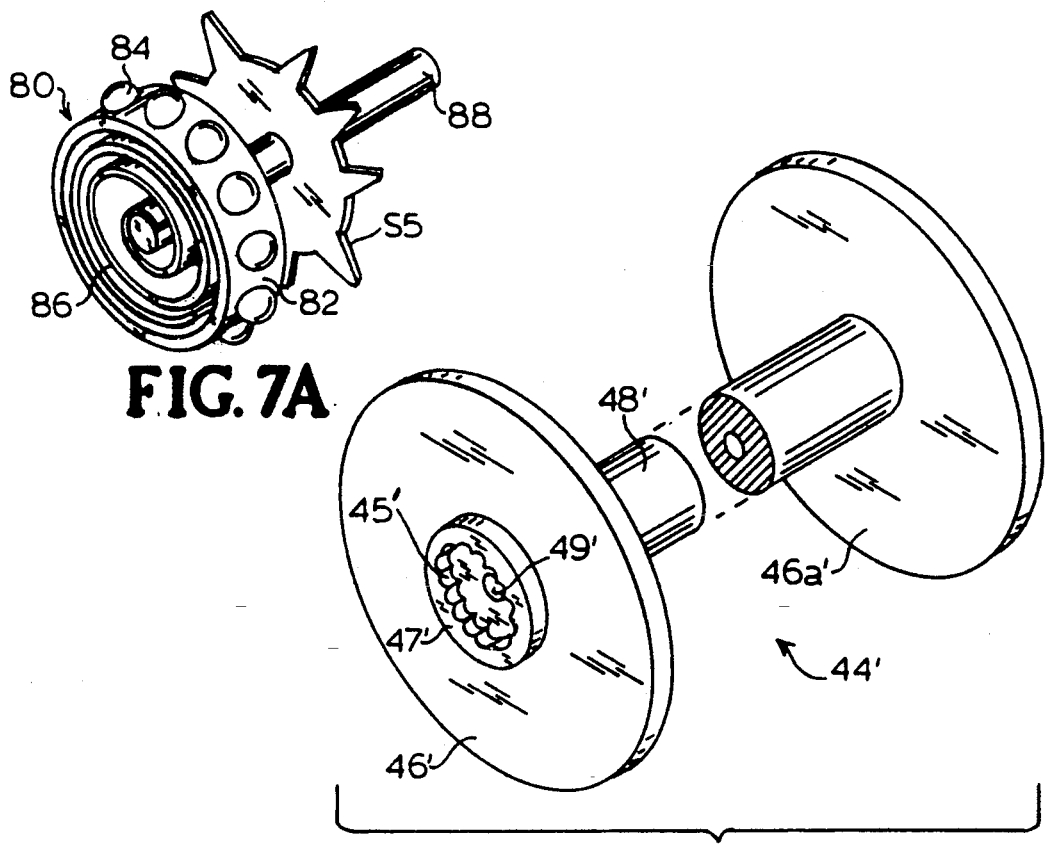
FIG. 7A
FIG. 7B

APPARATUS AND METHOD FOR DISPENSING DEFINED PORTIONS OF ICE CREAM OR A LIKE DEFORMABLE PRODUCT

FIELD OF THE INVENTION

This invention relates to the field of automatic product dispensing apparatus and methods, and more particularly to dispensing portions of products, such as frozen ice cream and the like, supplied in a continuous tubular casing.

BACKGROUND OF THE INVENTION

The teachings of prior related U.S. Pat. Nos. 4,762,483 and 4,830,864 issued to the inventor of the present invention are incorporated herein by reference. As will be seen from later description, the present invention represents an improvement upon the teachings of the inventions of the prior patents.

U.S. Pat. No. 4,762,483 is for an Apparatus for Packaging and Dispensing Ice Cream and The Like. Patent '483 describes a machine which measures and cuts off a portion of a frozen food product which is packaged in a coiled tubular casing. The mechanism for cutting off the product is a thin blade which is linearly actuated much in the fashion of a guillotine. The separated portion of a frozen food or similar product, is then transferred by a scoop device to a receiving container.

U.S. Pat. No. 4,830,864 is for a Method for Packaging and Dispensing Ice Cream and the Like. The '864 patent is a division of the '843 patent and deals with the preparatory process of packaging the frozen food product into the casing to be subsequently handled by the dispensing machine of the '483 patent.

The idea of packaging and dispensing products from a disposable casing is a practical one for commercial establishments and for automated, consumer-operated equipment as well. A difficulty encountered with the mechanism of the '483 patent is that the mechanical components, particularly the cutting device and the scoop moving components, come into direct contact with the food product. This product contact means there is a significant cleaning requirement. Since the product being cut and served is intended to be a food product, a sanitation concern exists. Cleaning is required periodically to keep the parts in condition to function, and, if a change in product were to occur, to prevent unwanted product mixing.

The prior patents noted are directed primarily to handling and dispensing ice cream and the like. The present invention is likewise applicable to ice cream, and additionally is recognized as possibly being useful in dispensing controlled portions of other food and non-food products.

The method of constricting a product packed within a casing has been done before, particularly with sausages. Such a method and apparatus is taught in U.S. Pat. No. 5,049,108 to Georg Staundenrausch. In the '108 patent, a strand of sausage filled casing is rotated about its axis as it is constricted by a pair of rotating constrictor elements. As will be seen, the apparatus and method of the present invention does not rotate the strand and adds the steps of forming the cased product, slitting the casing and winding the slit casing while dispensing the ice cream product. In addition, it has been observed that sausage is typically packed in edible casing which tends to adhere to the meat product.

It is recognized according to the present invention that a product such as ice cream or the like has certain mechanical characteristics, significantly that of being malleable. Thus, ice cream, for example, can be deformed with a moderate amount of pressure. When deformation results in a product such as ice cream being compressed to a relatively thin cross section, the compressed section will have low tensile strength and will readily and spontaneously separate a portion defined by two spaced apart compressed sections. With these properties, more or less, a commodity or product such as ice cream when encased in a compressible tubular casing will function according to the processes of the invention disclosed.

Therefore, it is an objective of the present invention to provide a method and apparatus capable of dispensing measured portions of a product such as ice cream packaged in a disposable casing.

It is an additional objective of the present invention to provide a dispensing apparatus for dispensing ice cream or the like, the operative parts of which do not come into intimate contact with the product.

It is a further objective of the present invention to provide a dispensing method and apparatus in which the supply of product such as ice cream or the like, can be quickly and efficiently replaced.

The foregoing and other objectives will become apparent from the disclosure that follows.

SUMMARY OF THE INVENTION

The invention disclosed herein provides a novel method and apparatus for dispensing uniform portions of a product, e.g. ice cream, in an automatic process. The product is encased in a disposable tubular casing which is coiled and placed in the apparatus from which the product is dispensed. The product must be readily deformable and readily releasable from the casing. Within the apparatus, the tubular cased product is first pulled through a pair of freely rotating forming rollers to create a desired cross sectional shape and is then drawn between the first of a pair of driven reels. Each reel has a set of circumferentially spaced rods. When a rod of one reel moves into closely spaced relation with an opposing rod of the other reel, the pair of reels acting in unison tend to pinch the encased product at intervals related to the spacing between the sets of rods. The similarly constructed second one of the pair of driven constricting reels between which the encased product is drawn, pinches the product more severely than does the first reel so as to effectively separate and define uniform portions of the product within the casing, leaving the casing as support. The encased product which is now severely pinched at uniform spaced intervals, next moves through a mechanism for slitting opposite sides of the casing following which each half of the slit casing is pulled away from the product and is stored on a scrap removal device. The scrap removal devices are driven from the same mechanism which is used for driving the constricting reels and incorporate special slip drives. The ice cream or similar product now free of its casing is finally dispensed through a dispensing apparatus.

BRIEF DESCRIPTION OF THE DRAWINGS

FIG. 7 is a sectional side view of a scrap spool illustrating how the spool is held between a spring clamping means and slip driving means.

FIG. 7A is a perspective view of a slip driving hub of the invention.

FIG. 7B is a perspective view of a scrap spool of the invention.

DESCRIPTION OF THE PREFERRED EMBODIMENT

Figure 10:
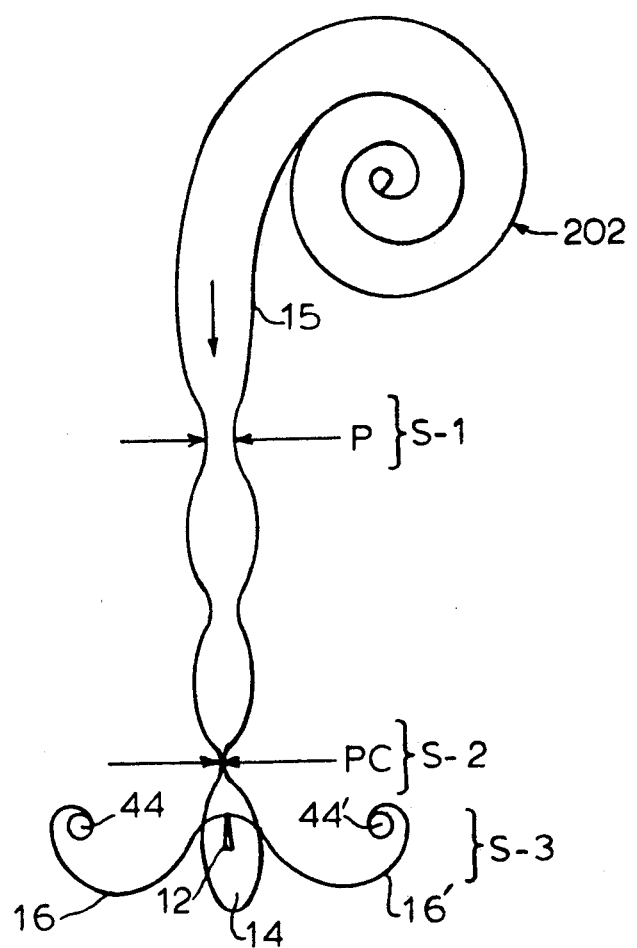
FIG. 10 is a schematic representation of the method of the invention.

The method of the invention is illustrated schematically in FIG. 10 to which reference is first made for overall background. While FIG. 10 portrays the process path oriented vertically and other drawing figures show the process path in other orientations, it will be understood from the description that follows that the method and apparatus disclosed are generally independent of orientation.

With continuing reference to FIG. 10, a supply coil 202 of ice cream filled casing 15 is fed through three operative stations S-1, S-2 and S-3 in sequence. At the first station S-1, there is applied a moderate pinch P to ice cream filled casing 15 by means of a first pinching mechanism. Due to the pliable nature of the casing and the malleable nature of the encased ice cream, the encased product maintains its pinched shape beyond the release of the pinching mechanism. At the second station S-2, there is applied a more severe pinch PC to ice cream filled casing 15. At the third station S-3, one or more knives 12 are employed to contact and slit opposite sides of casing 15 and release a single ice cream portion 14, being the amount of ice cream product between sequential pinched sections. The casing halves 16, 16' are simultaneously withdrawn by later described scrap devices 17, 17' for later discard.

Figure 1:
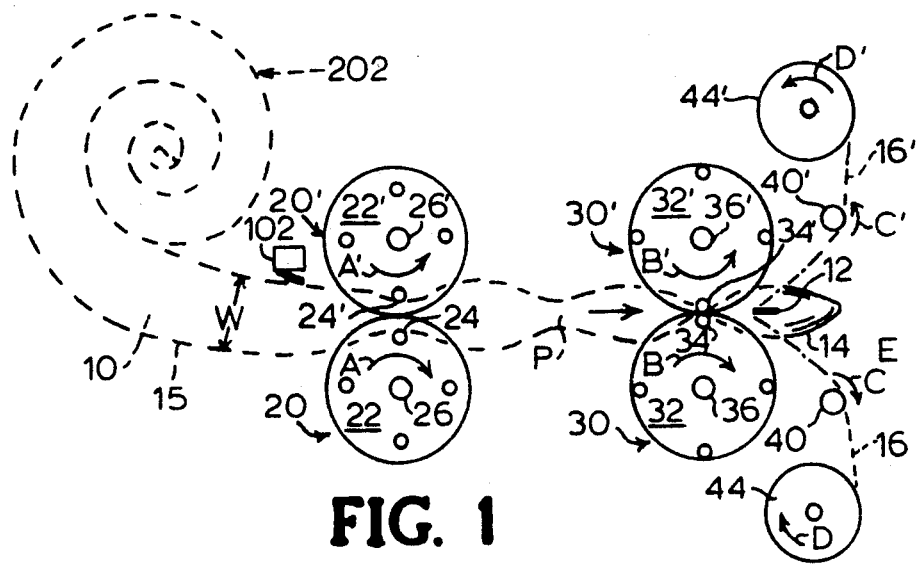
FIG. 1 is a schematic representation of the apparatus of the invention illustrating its major operative components processing an encased ice cream product, by way of example, in a generally horizontal orientation.

Having given a general description in reference to FIG. 10, reference is next made to FIG. 1 and a diagrammatic representation of the apparatus and method of the invention in which attention is directed, by way of example, to the separation of a malleable tube-encased ice cream product into portions of a selected size. According to FIG. 1, a malleable material, such as ice cream 10, and a surrounding flexible casing formed by tubing 15 is fed to the apparatus of the invention from a supply, illustrated, by way of example, as being in the form of a large coil 202 of encased ice cream and which is transported along a defined path having an entry and through the apparatus generally in the direction of the arrow in FIG. 1 to an exit point E. While not shown, coil 202 may be mounted on any form of suitable spindle, support channel, or the like. As ice cream 10 in casing 15 enters the apparatus, it comes in contact with monitoring switch 102 which is closed by contact with casing 15 and opens in the absence of casing 15 filled with ice cream 10.

It is recognized that the encased ice cream 10 or other product should not tend to adhere to the interior surface of the tubing forming its casing 15. With this in mind, it has been found that an acceptable casing 15 for encasing a product such as ice cream is a thin wall, e.g. 0.05 mm thick, Unilox clear poly tubing manufactured by the Leepack Company of Chicago, Ill. with a nominal diameter of 50.8 mm (2.0 inches). Typically, reel 202, when full, will mount a length of casing 15 of approximately 15 m (50 feet) so as to contain sufficient ice cream 10 to dispense about 300 portions 14. Product 10, encased in tubing 15, is pulled toward its discharge destination, i.e. exit E by reasons of being engaged and pulled by the driving force of the cooperating pairs of rotating reels 20, 20' and 30, 30', each reel having a series of four circumferentially spaced mounted rods designated as 24, 24', 34, 34', respectively.

Figure 1A:
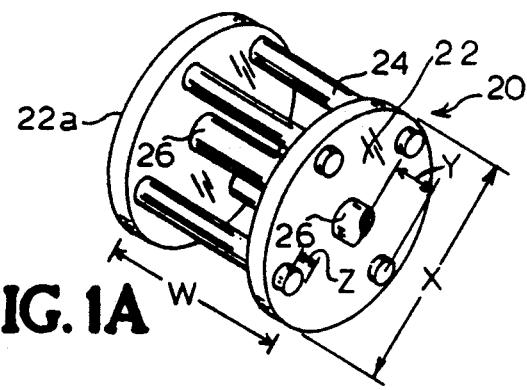
FIG. 1A is a perspective view of a typical reel of the invention having rods operative to constrict the encased product at uniform intervals.

The configuration of reels 20, 20', 30, 30' will best be understood by reference to the perspective view of typical reel 20 as illustrated in FIG. 1A. Reel 20 has two parallel round side plates 22, 22a which are mounted so as to be concentric with shaft 26 and so as to have their major planes oriented perpendicular to shaft 26. Plates 22, 22a of reel 20 are separated from each other by a distance which is approximately equal to the width W of the encased ice cream product 10. The previously referred to series of rods 24 are assembled so as to span the space between plates 22, 22a and are equally outwardly spaced from shaft 26. In the preferred embodiment, plates 22, 22a are approximately 81 mm. (3.2 inches) in diameter (dimension X), rods 24 are about 6 mm. (0.236 inches) in diameter (dimension Z), and are spaced 31.5 mm. (1.24 inches) from shaft 26, center to center (dimension Y). Reels 20, 20' (FIG. 1) and, therefore plates 22, 22', are spaced a distance V (FIG. 1) of 82 mm (3.23 inches) apart, center to center. This configuration results in a separation between rod 24 of reel 20 and rod 24' of reel 20' of 12.7 mm. (0.50 inches) when the rods 24, 24' are at their closest proximity as in FIG. 1. As will be described below, reels 20, 20' are driven synchronously in opposite rotational directions with each set of rods 24, 24' being angularly coordinated. Reel sets 30, 30' are configured and spaced from each other similarly to those described above, with the modification that the respective rods 34, 34' are spaced at a distance from the respective shafts 36, 36' such that the space between rods 34, 34' on adjacent reels 30, 30' at their minimum distance is 0.1 mm. (0.004 inches) apart. This approximates the combined wall thickness of the two sides of casing 15, thus pinching product 10 to essentially zero thickness.

Returning to FIG. 1, it is seen that as reels 20, 20' rotate in opposite directions as indicated by arrows A, A' with rods 24, 24' in synchronization, encased ice cream product 10 passes intermittently through a section with no rod contact and a section with rod contact against casing 15. Where the encased product 10 passes without contacting rods 24, 24', the product will be substantially undistorted and will retain its width W. Where the encased product 10 passes between rods 24, 24' at their minimum spacing as shown, product 10 will be pinched relatively slightly to a thickness approaching 12.7 mm (0.5 inches), the spacing between the outer diameter of rods 24, 24'. The resultant pinched section P can be seen in FIG. 1 in the portion of the encased product 10 as shown between the first pair of reels 20, 20' and the second pair of reels 30, 30'.

Continuing with FIG. 1, reels 30, 30' are driven in the same rotational direction as reels 20, 20' and at the same rotational speed, so that casing 15 and its encased product 10 will travel from one to the other pair of reels essentially without stretch or sag. The spacing between the first set of reels 20, 20' and the second set of reels 30, 30' is established to pinch casing 15 and the encased ice cream 10 sequentially at equally spaced apart locations. Since rods 34, 34' are positioned on plates 32, 32' so as to be closer to each other at their closest position than rods 24, 24' are to each other, the encased product 10 is pinched relatively more severely when passing between rods 34, 34' at their closest spacing. This pinching obtained by rods 34, 34' is sufficient to nominally separate portion 14 with the exception that the casing 15 continues to support the encased product 10 and keep the portions from actually separating.

As casing 15 with its encased product 10 is drawn along by the rotation of reels 30, 30', it continues to move in the direction indicated by the arrow in FIG. 1. Beyond reels 30, 30', opposite outer side portions of casing 15 make contact with a pair of laterally disposed, inwardly directed cutting knives 12 adapted and positioned to slit both sides of casing 15 and allow the separated sides to be pulled away from the encased product 10. The action of separating casing 15, having been slit into casing halves 16, 16', occurs as a combined effect of driven scrap spools 44, 44' and elipsoidal idler rollers 40, 40', (see FIG. 6) so that product 10 emerges from casing 15 as a succession of individual ice cream portions 14. Half casing or tubing scraps 16, 16' pass rollers 40, 40' respectively and are coiled and stored on scrap spools 44, 44' which rotate in opposite directions as shown by arrows D, D'.

Figure 4:
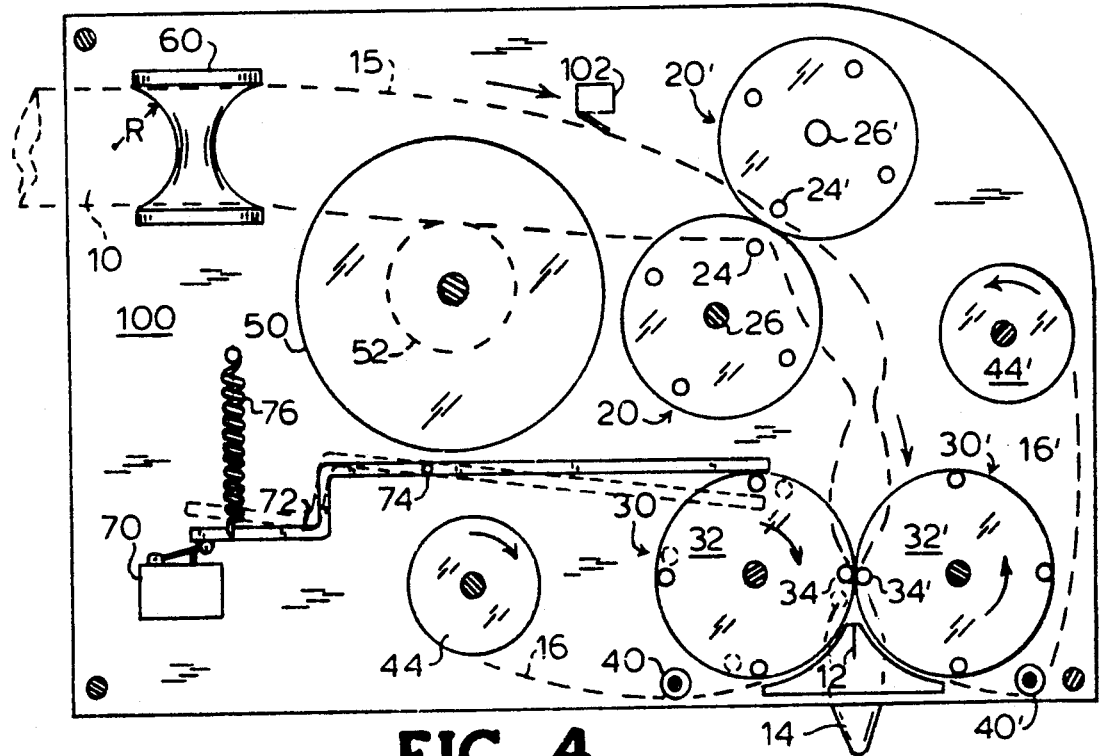
FIG. 4 is an elevation sectional view taken in the direction of line 4—4 of FIG. 2 and illustrates the major components of the apparatus which act upon the encased product being processed.
Figure 5:
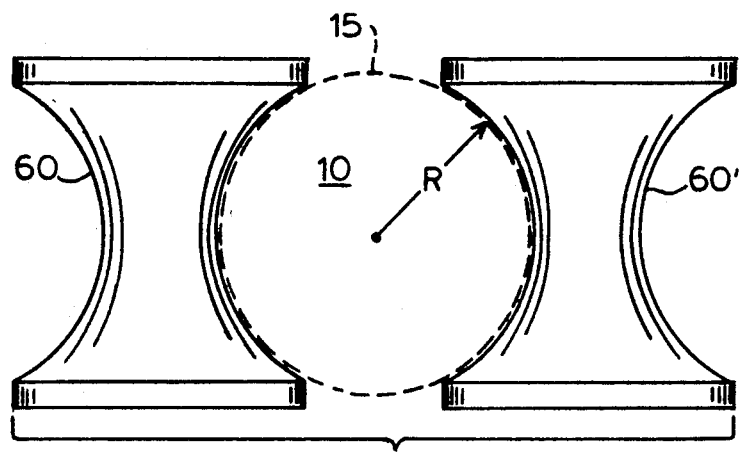
FIG. 5 is a side elevation view of the encased product forming rollers of the invention.

Having thus described the major operations and the method employed, further details of the physical apparatus are illustrated in FIG. 4. Since the encased ice cream product 10 is malleable and may be supplied in a roll which tends to distort the cross sectional shape of the encased product 10 and its casing 15, the product filled casing 15 is first passed through a pair of forming rollers 60. In the preferred embodiment, two freely rotating rollers 60, 60' are respectively mounted between side plates 100, 100a with their respective axes parallel to each other. Each roller 60, 60', shown in detail in FIG. 5, is formed with a contoured product-shaping surface of radius R, uniform around its circumference, so as to form product 10 and its casing 15 into a round cylinder. In the preferred embodiment which utilizes a casing of 50.8 mm (2.0 inches) diameter, radius R is equal to 25.4 mm (1.0 inch). Other configurations of forming rollers 60, 60' would result in different cross sectional contours of the encased product 10.

Continuing with the description of the apparatus in FIG. 4, casing 15 with its encased product 10 is next drawn over an idler spool 50 which serves to support and align the encased product 10 and its casing 15 with the intersecting position of reels 20, 20'. Casing 15 and its encased product 10 are then passed between typical rods 24, 24' of reels 20, 20' to moderately or relatively slightly pinch the encased product 10 by compression of the outer dimension as previously explained and next between rods 34, 34' of reels 30, 30' imposing a greater pinch constriction.

Figure 9:
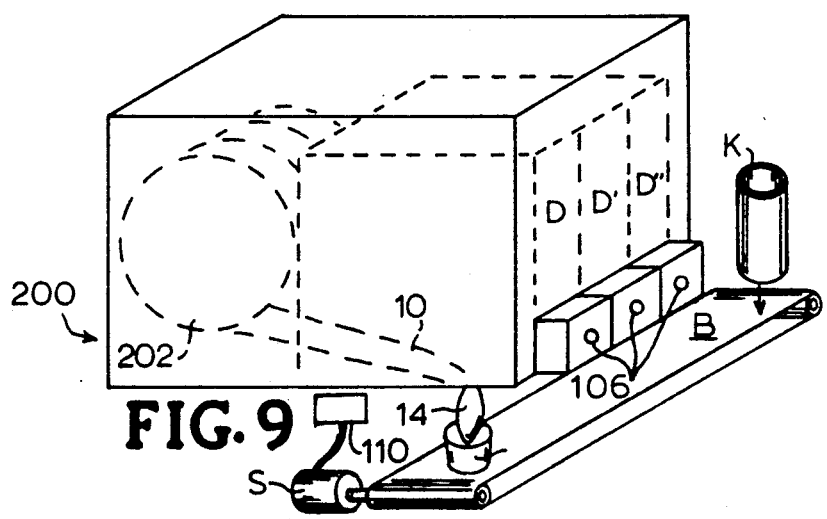
FIG. 9 is a perspective view of an ice cream dispensing machine, shown by way of example, incorporating several product processing apparatuses according to the invention, each apparatus being capable of functioning and dispensing a particular ice cream independently of the other apparatus.

In the physical embodiment being described in reference to FIG. 4, the path followed by the encased product 10 is generally curved, rather than straight as in the diagrammatic representation of FIG. 1 above. This curved path serves the purposes of discharging separated portion 14 in a preferred vertical orientation and of saving space. Other path shapes and discharge directions are possible. As knife 12 slits plastic tubing 15 into halves 16, 16', each half is pulled away from portion 14 and passes ellipsoidal rollers 40, 40' to be wound onto scrap spools 44, 44'. This removal of the casing 15 allows constrictively separated portion 14 to drop freely into a waiting container, such as a cup C (FIG. 9). No further cutting is needed to separate and release portion 14. Of particular significance is the fact that essentially all machine contact is with the tubing forming the casing 15 and not directly with the encased ice cream product 10 thus one of the principal objectives of the invention is achieved.

Figure 8:
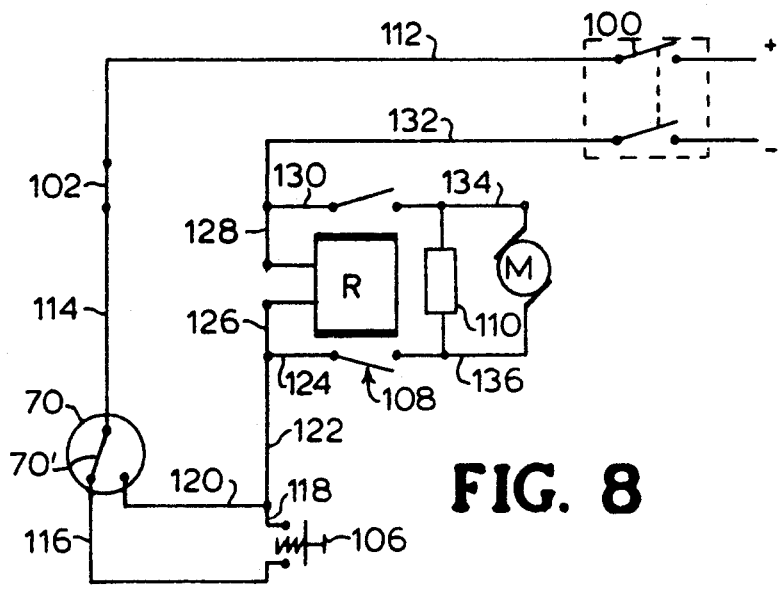
FIG. 8 is a schematic diagram of the electrical circuit of the apparatus of the invention.

The electric circuit employed in the mechanism is diagrammed in FIG. 8. To activate the A-C electric power supply, switch 100 is closed to complete a circuit with both sides of the power supply. In the embodiment of a coin operated vending machine, switch 100 represents a coin switch, as shown in dashed lines. An operator of the apparatus activates spring loaded push button switch 106 which connects one side of switch 100 through wire 112 to normally closed switch 102. Switch 102 serves to monitor the continuity of feeding casing 15 and the encased product 10 into the dispensing apparatus, and, by means of a mechanical spring loaded link (not shown), switch 102 is opened if that supply terminates. Assuming there exists a continuous supply of encased ice cream product 10 and that switch 102 is closed, power proceeds to one side of the single cycle switch 70 through wire 114. In many applications, such as in a coin operated vending machine, it is preferred to dispense a single portion 14 and to stop the apparatus after each portion 14. To accomplish this end, single cycle switch 70 is provided with actuating arm 72, as shown in FIG. 4. When the mechanism is started by means of the switch 106 (FIGS. 8 and 9) so that a motor M (FIG. 2) drives the components as herein described, a distal end of arm 72, which is pivoted at pin 74 and biased away from switch 70 by spring 76, drops between consecutive rods 34 as shown in dashed lines. In the position shown, arm 72 (FIG. 4) is held up by a rod 34 of reel 30, and switch arm 70' (FIG. 8) is in position to transmit to wire 116, allowing push button switch 106 to close the circuit. On the continuing assumption that switch 100 is now closed, by closing switch 106 against pressure of its internal spring, power is transmitted to servomotor control 110 and to both sides of relay R through wires 122, 132 and to relay contacts 108, 108' by wires 124, 130. Servomotor control 110 receives input from a flavor selection switch 106 and transmits to servomotor S so that belt B (FIG. 9) moves cup C to the selected flavor exit point. Activation of relay R causes contacts 108, 108' to close and complete the circuit to motor M through wires 134, 136. Upon rotation of motor M, reel 30 turns and releases arm 72 (as shown in dashed lines in FIG. 4) so that the switch arm 70' of switch 70 switches to conduct current to wire 120, thereby maintaining the circuit to relay R regardless of the position of push button 106. Motor M continues to operate until either the cycle completes and the next rod 34 of reel 30 (FIG. 4) lifts arm 72 and switches the switch arm 70' of switch 70 back to wire 116, or the supply of product runs out and switch 102 opens. While not shown, an added feature would be to add a circuitry so that when switch 102 opens, a signal would be generated to alert an operator that a new supply reel 202 is needed.

As the described process operates, the encased product 10, is always protected by the tubing forming casing 15 and therefore, never actually touches mechanical components. The only contact that occurs is the tip of knife blade 12, and that is a minimal contact with a stationary part and does not tend to accummulate residue to any significant extent.

Figure 3:
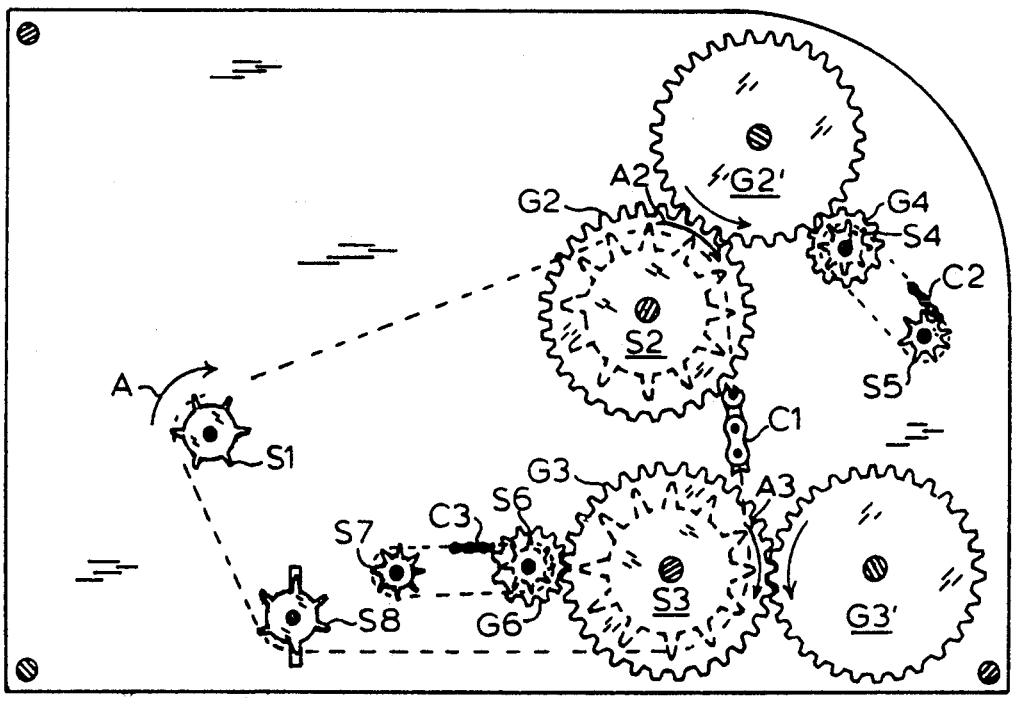
FIG. 3 is an elevation sectional view taken in the direction of line 3—3 of FIG. 2 and illustrates the drive components of the apparatus.

The description above dealt with the operative portions of the apparatus which move and act on the product, as shown in FIG. 4. The description next refers to the drive train providing power and motion to the apparatus as seen in FIGS. 2, 3.

Figure 2:
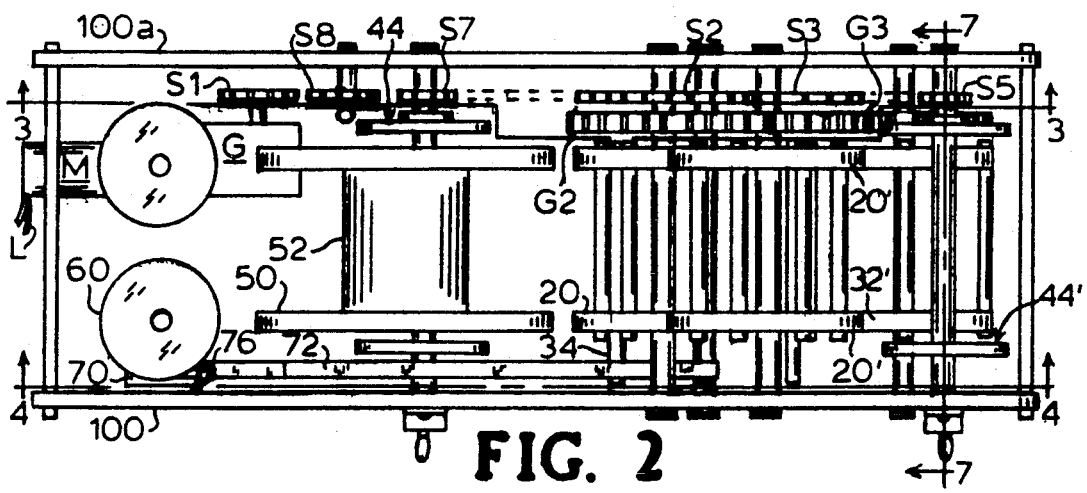
FIG. 2 is a top plan view of the apparatus of the invention illustrating the operative and drive components thereof.

The invention apparatus is driven by a motor M which is coupled to a gearbox G, as shown in top plan view FIG. 2. The output shaft of gearbox G turns sprocket S1 which is connected to the driven components by drive chain C1, illustrated in FIG. 3. Drive chain C1 follows a circuitous path in the direction of arrow A (FIG. 3) from sprocket S1, around sprocket S2, around sprocket S3 and around tensioning sprocket S8. Sprockets S2, S3 are fixedly and concentrically attached to adjacent gears G2 and G3 respectively. As drive chain C1 rotates sprockets S2, S3, gears G2, G3 are each caused to rotate in the direction of arrows A2, A3. Gear G2 is mated together with equal gear G2' and each of them is respectively connected coaxially with reels 20, 20' (shown in FIG. 4) which rotate equivalently therewith. Similarly, gear G3 is mated together with equal gear G3' and each of them is respectively connected coaxially with reels 30, 30' (shown in FIG. 4) which rotate equivalently therewith. Sprocket S8 is mounted so as to enable adjustment of the tension of chain C1 by any convenient means, such as a slot (as illustrated) or a swing arm.

Gear G4 is engaged with and driven by gear G2'. Gear G4 is mounted on a common shaft with sprocket S4. Sprocket S4 is connected by drive chain C2 to sprocket S5, and by the shaft on which sprocket S5 is mounted, drives hub 80 of scrap spool 44' (FIGS. 4 and 7). Gear G6 is engaged by adjacent gear G3 and drives coaxial, fixedly connected sprocket S6, drive chain C3, sprocket S7 and drive hub 80 of scrap spool 44 (FIG. 4). As will be described below, scrap spools 44, 44' are connected to their respective drive shafts by means of slip clutch mechanisms so as to accommodate to the varying speed required to wind up split casing halves 16, 16'.

In the preferred embodiment motor M and gearbox G are an integrated unit supplied by Dayton Electric Company as model number 22978, having a 1/15 hp motor and a 1787:1 gear ratio, and resulting in a final output speed of 2.8 rpm at full load. This combination with appropriate sprocket and gear sizes in the apparatus results in a desired output speed of one product portion (¼ revolution of reels 20, 30) per two seconds.

Figure 6:
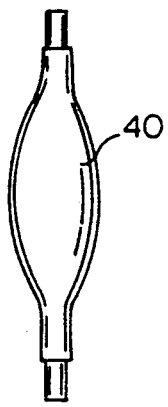
FIG. 6 is a top plan view of a scrap idler roller of the invention.

In the description above of FIGS. 1, 4 and the product contacting parts of the apparatus, elipsoidal idler rollers 40, 40' were identified as guiding split casing halves 16, 16' to scrap spools 44, 44' respectively. FIG. 6 shows a detailed plan view of typical roller 40, which has an ellipsoidal central contour tapering more narrowly toward each end thereof. This configuration assists in maintaining split halves 16, 16' of casing 15 from compressing to the center of spools 44, 44' as they respectively approach scrap spools 44, 44'. In this manner, the split casing will coil onto spools 44, 44' in a flat condition and efficiently fill the available space.

After casing 15 is split into two parts by knives 12 (FIG. 4), the two halves pass idler rollers 40, 40' and are taken up by the slip drive mechanism shown in detail in FIGS. 7, 7A, 7B. Referring to FIG. 7A, sprocket S5, which is driven by chain C2, is fixedly mounted on shaft 88 together with spool driver hub 80. Ring 82 is supported on shaft 88 by a connecting disc (not shown) and is formed with a series of holes through its circumference. The size of the formed holes is slightly less than the diameter of balls 84, a plurality of which are placed into contact with the inner surface of ring 82 and protrude through these holes. A helical flat spring 86 is placed within ring 82 so that its outer surface will press outwardly on balls 84, maintaining the position of balls 84 in the holes.

As illustrated in FIG. 7B, spool 44' is a composite of flanges 46', 46a', barrel 48' and socket 47'. Bore 49' passes completely through the middle of barrel 48' and is exposed on either end of spool 44'. Socket 47' is adapted and configured to receive ring 82 and balls 84 of driver hub 80 so that balls 84 press into the scalloped periphery grooves 45' within socket 47'. If driver hub 80 turns and spool 44' resists turning, the scalloped grooves 45' force balls 84 inwardly against the bias of spring 86 and hub 80 will continue to turn while spool 44' is held still. This arrangement maintains tension on casing halves 16, 16' (FIG. 1) under a wide range of speeds. Driver hub 80 is driven at a speed equal to the linear speed of casing 16' to be wound onto spool 44' when spool 44' is empty.

The mounting of spool 44' into the mechanism of the invention is shown in FIG. 7. At the non-driven end of spool 44', pin 92 is biased with an annular spring clip 95 and a compression spring 96. Cap 94 is attached to apparatus side wall 100 by screws 99 or other convenient means. In use, the operator pulls pin 92 outward and places spool 44' between the apparatus walls 100, 100a so that socket 47' accepts driver hub 80. When pin 92 is released, spool 44' is pressed against hub 80. The forward end of pin 92 rests in recess 97 in the end of spool 44' and is somewhat larger than bore 47' of barrel 48 so that pin 92 will rest against a solid surface and keep spool 44' concentric with pin 92.

An adaptation of the mechanism of the invention is shown in FIG. 9, depicting several said mechanisms D, D', D" mounted in parallel in an anticipated dispensing machine cabinet 200. A refrigeration unit capable of maintaining a ice cream product in a frozen condition is included in machine cabinet 200. By having plural mechanisms D, a selection of ice cream flavors may be had. At the supply end of machine 200 are a bank of three supply coils 202, each feeding a different flavor of ice cream to one dispensing mechanism D. Push button 106 on each mechanism will activate the apparatus as described above and cause a single serving 14 to be dispensed below into a waiting cup C or other receptacle. This arrangement is useful in a restaurant or even in a private home. As an alternate means to initiate activity to pushbutton 106, a coin operated switch 100 (FIG. 8) may be used to energize the electric circuit as is commonly known. The addition of a coin operated switch would allow a vending machine containing the apparatus of the invention to be located in public areas and only serviced periodically.

A further feature is especially applicable to a coin operated function so as to supply a container such as cup C to the appropriate mechanism D, D', D". A cooperative cup dispenser K and cup position belt B function in coordination with each apparatus D, D', D". When a coin is placed in a coin receptor, cup dispenser K delivers a single cup to stationary belt B. When the user selects a desired flavor in response to a prompt light (not shown) servomotor S is activated by means of servomotor control 110 to position cup C beneath the appropriate exit chute for portion 14 by means of activating belt B.

As has thus been disclosed, the apparatus and method of the invention achieves its desired objectives. The apparatus is adapted to automatically dispense uniform measured portions of ice cream or like product. A supply of the dispensed product can be easily replaced. The major parts of the machine only contact the tubular casing and do not directly contact the ice cream product. Therefore, very little cleaning of the machine parts is needed. In addition, the apparatus is adaptable to multiple mounting in a cabinet either for a restuarant or private use having a selection of flavors available and an automatic cup positioner. If a coin operated switch is incorporated, the apparatus can be put in a public place as a vending machine.

In accordance with the disclosure above, the embodiment disclosed herein is understood to be an example of, and not a limitation upon the scope and principles of the invention.

What is claimed is:

1. An apparatus for automatically dispensing a controlled quantity of a deformable product packed in a flexible tubular casing from which the product can be readily released and with which the product is capable of retaining a deformed shape, said apparatus comprising:
    (a) a supply station providing means for holding a supply of a product packaged in a tubular casing having a longitudinal axis;
    (b) driving means adapted to move said product and its casing from said supply station through said apparatus along a defined path;
    (c) means located at intervals along said path for compressing a series of longitudinally separated segments of said product by forces applied perpendicular to the longitudinal axis of said casing at selected intervals along said axis as said casing with its encased product is moved through said apparatus;
    (d) means located at an exit end of said path for opening said casing such that a portion of product defined by two sequential compressed segments of said product can be removed from said casing;
    (e) means for removing said opened casing from said portion; and
    (f) means for releasing said portion from said apparatus at said exit end of said path.

2. The apparatus claimed in claim 1, further comprising an entry guide located at an entry end of said path adapted and positioned so as to form said product filled casing into a uniform substantially round cross sectional shape that is linearly continuous for some predetermined distance in the direction of said axis.

3. The apparatus claimed in claim 1 in which said means for opening said casing comprises a pair of laterally opposed, laterally separated, inwardly directed cutting blades positioned to slit opposite sides of said casing proximate said exit of said path.

4. The apparatus claimed in claim 2 in which said means for compressing a segment of said product comprises means mounting a pair of opposed bars located on opposite sides of said casing adapted to periodically converge to a position wherein the bars are spaced apart a distance which is less than the diameter of said product filled casing exiting said entry guide.

5. The apparatus as in claim 4 in which said driving means operates intermittently in response to a signal and stops automatically after completing a predetermined cycle.

6. A method for automatically dispensing a controlled quantity of a deformable product packed in a flexible tubular casing from which the product can be readily released and with which the product is capable of retaining a deformed shape, comprising:
    (a) supplying a product packed in a flexible casing having a longitudinal axis to a dispensing apparatus;
    (b) moving said casing with its encased product through said apparatus;
    (c) compressing a series of separated segments of said product at selected intervals along said axis to define a product portion as said product is being moved through said apparatus;
    (d) removing said casing from said product portion; and
    (f) releasing said product portion from said apparatus.

7. The method of claim 6, further comprising forming said product in said casing into a uniform cross-sectional shape prior to segmentally compressing said product.

8. The method of claim 7 in which said process of removing said casing comprises cutting said casing along at least one line parallel to said axis.

9. The method of claim 8 in which said process of removing said casing further comprises coiling said cut casing onto a spool for disposal.

10. The method of claim 9 wherein said product is moved intermittently in response to a signal.

11. An apparatus for automatically dispensing a controlled quantity of a deformable product packed in a flexible tubular casing from which the product can be readily released and with which the product is capable of retaining a deformed shape, comprising:
    (a) a pair of substantially vertical, fixedly connected planar, parallel, spaced apart side walls between which walls said product travels along a defined path from an entry to an exit;
    (b) means to move said product along said defined path from said entry to said exit;
    (c) product forming means mounted between said walls near said entry and configured so as to form said product into a linearly continuous substantially uniform cross sectional shape;
    (d) product constricting means mounted between said walls in a position downstream from said forming means and operative to constrict a series of separated segments of said product along a line substantially perpendicular to said path so as to create a series of product portions of equal quantity between said constricted segments;

(e) means adapted to open said tubular casing and mounted between said walls at a location along said path downstream from said product constricting means; and (f) means to expel successive said product portions at said exit.

12. An apparatus as claimed in claim 11 in which said product is a food product.

13. An apparatus as claimed in claim 11 in which said means to move said product comprises a series of inter-related drive sprockets, drive chains and gears actuated by a motor means and being connected operationally to said product constricting means.

14. An apparatus as claimed in claim 13 in which said product forming means comprises a pair of rollers mounted rotatably on parallel axes and having a contoured surface configured to form said product in said casing into a uniform round cylindrical shape.

15. An apparatus as claimed in claim 14 in which said product constricting means includes a bar which is operatively connected to said product moving means so as to intermittently impact said casing with its encased product and cause a constriction thereby.

16. An apparatus as claimed in claim 14 in which said product constricting means comprises a pair of cooperatively operating bars operatively connected to said product moving means so as to impact opposite sides of said product in said casing simultaneously causing a constriction thereby.

17. An apparatus as claimed in claim 14 in which said product constricting means comprises two pairs of cooperatively operating bars, a first pair constricting said product relatively slightly and a second pair constricting said product relatively severely so as to create a virtual separation between portions of said product.

18. An apparatus as claimed in claim 11 in which said casing opening means comprises a knife blade fixedly positioned between said walls so as to intercept said casing.

19. An apparatus as claimed in claim 13 further comprising switching means coordinated with said product constricting means and adapted to stop said motor means in a manner related thereto.

20. An apparatus as claimed in claim 11 further comprising means to remove said tubular casing from said product after said casing has been opened and as each said portion is dispensed.

21. An apparatus as claimed in claim 20 in which said means to remove said casing from said product comprises one or more scrap spools which are connected to a slip drive mechanism driven by said means to move said product so as to accommodate said casing discharge speed from an empty spool condition to a full spool condition.

22. An apparatus as claimed in claim 21 further comprising plural product dispensing apparatuses built into an automatic dispensing machine having a coordinated cup dispenser and cup positioning belt.

23. A method for dispensing a portion of a frozen food product from a bulk supply, comprising:

(a) forming a bulk supply of the product by packaging the product in a substantially long tubular casing extending between leading and trailing end portions and formed of a material from which the product can be readily released;

(b) feeding the leading end portion of the casing with its encased product along a path and at selected intervals sequentially pinching the casing so as to form the product contained between sequential pinched segments into an individual portion; and (c) while continuing to move the casing containing the individual portion of the product, removing the casing from around the product so to permit the individual formed portion to be discharged from the casing.

24. A method as claimed in claim 23, wherein said pinching of the casing and its encased product is performed with a pair of rotating pinching elements located on opposite sides of the casing and which rotate periodically into closely spaced position to pinch the casing including its encased product.

25. A method as claimed in claim 23, wherein said product comprises ice cream.

26. An apparatus for dispensing a portion of a frozen food product from a bulk supply, comprising:

(a) a supply station providing a bulk supply of the product packaged in a substantially long tubular casing extending between leading and trailing end portions and formed of a material from which the product can be readily released;

(b) feed-pinch means operative for feeding the leading end portion of the casing with its encased product along a path and at selected locations on the casing leading end portion for pinching the casing so as to form the product between such pinched locations into a defined portion of the product; and (c) stripping means operative while said casing leading end portion is moving for removing the casing from said defined portion so as to permit such defined portion of the product to separate from the casing.

27. An apparatus as claimed in claim 26, wherein said bulk supply provides a bulk supply of ice cream.

* * * * *